US011671911B2

(12) United States Patent
Griessmeier

(10) Patent No.: US 11,671,911 B2
(45) Date of Patent: Jun. 6, 2023

(54) SLEEP-MODE FOR ETHERNET CONTROLLER

(71) Applicant: Andrew Wireless Systems GmbH, Buchdorf (DE)

(72) Inventor: Joachim Griessmeier, Polsingen (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 9 days.

(21) Appl. No.: 17/096,060

(22) Filed: Nov. 12, 2020

(65) Prior Publication Data

US 2021/0160773 A1 May 27, 2021

Related U.S. Application Data

(60) Provisional application No. 62/941,164, filed on Nov. 27, 2019.

(51) Int. Cl.
*H04W 52/02* (2009.01)
*H04W 16/26* (2009.01)

(52) U.S. Cl.
CPC ....... *H04W 52/0203* (2013.01); *H04W 16/26* (2013.01)

(58) Field of Classification Search
CPC .. Y02D 30/70; H04W 16/26; H04W 52/0203; H04W 52/02; H04L 49/352; H04L 63/0428; H04L 47/10; H04L 47/266; H04L 45/04; H04L 12/931; H04L 12/54; G06F 9/547; G06F 13/28; H04B 1/16; H04B 1/38; H04M 1/00

USPC ........................................................ 370/311
See application file for complete search history.

(56) References Cited

U.S. PATENT DOCUMENTS

| | | | |
|---|---|---|---|
| 5,404,544 A * | 4/1995 | Crayford | H04L 12/12 340/5.74 |
| 6,351,820 B1 * | 2/2002 | Oh-Yang | H04L 12/12 713/323 |
| 7,317,732 B2 * | 1/2008 | Mills | H04L 12/12 370/465 |
| 7,350,087 B2 * | 3/2008 | Naveh | G06F 1/3203 713/320 |
| 8,234,510 B2 * | 7/2012 | Diab | H04L 12/12 713/320 |
| 8,261,114 B2 * | 9/2012 | Diab | H04L 12/12 713/320 |

(Continued)

*Primary Examiner* — Man U Phan
(74) *Attorney, Agent, or Firm* — Fogg & Powers LLC

(57) ABSTRACT

In an example, a configuration circuit includes a connector and a controller communicatively coupled to the connector via one or more signal lines. The configuration circuit further includes a microcontroller communicatively coupled to the controller via an interface. The configuration circuit further includes a connection detection circuit communicatively coupled to the microcontroller and the one or more signal lines. The connection detection circuit is configured to determine whether communication traffic between the connector and the controller on the one or more signal lines is detected, and output an interrupt signal to the microcontroller in response to detecting communication traffic between the connector and the controller on the one or more signal lines. The microcontroller is configured to instruct the controller to wake from a low-power sleep mode in response to receiving the interrupt signal from the connection detection circuit.

18 Claims, 5 Drawing Sheets

(56) References Cited

U.S. PATENT DOCUMENTS

| | | | |
|---|---|---|---|
| 8,347,121 B2* | 1/2013 | Matthews | H04L 12/12 370/230.1 |
| 8,509,859 B2* | 8/2013 | Jarosinski | H04W 52/0225 455/343.1 |
| 8,656,195 B2* | 2/2014 | Dove | H04L 12/40032 713/320 |
| 8,667,311 B2* | 3/2014 | Lindsay | G06F 1/3209 713/323 |
| 8,850,250 B2* | 9/2014 | Looi | G06F 1/3287 710/316 |
| 8,892,915 B2* | 11/2014 | Hua | H04L 12/10 713/323 |
| 8,995,289 B2* | 3/2015 | Diab | H04L 12/10 709/224 |
| 9,031,093 B2* | 5/2015 | Lusted | H04L 12/40136 370/468 |
| 9,094,197 B2* | 7/2015 | Chang | H04L 12/1881 |
| 9,110,668 B2* | 8/2015 | Diab | G06F 1/3278 |
| 9,590,920 B2* | 3/2017 | Kanigicherla | H04L 47/50 |
| 9,606,615 B2* | 3/2017 | Van Der Zanden | G06F 1/3293 |
| 9,612,653 B2* | 4/2017 | Gu | G06F 1/3296 |
| 9,747,538 B2* | 8/2017 | Gudan | G06K 19/0723 |
| 10,211,881 B2* | 2/2019 | Wang | H04B 3/32 |
| 10,306,397 B2* | 5/2019 | La | H04W 88/02 |
| 10,348,511 B1* | 7/2019 | Bagg | G06F 1/3278 |
| 10,965,477 B2* | 3/2021 | Lukács | H04L 12/10 |
| 10,966,219 B2* | 3/2021 | Raisoni | H04W 4/80 |
| 10,972,293 B1* | 4/2021 | Benyamin | H04L 12/10 |
| 11,005,670 B2* | 5/2021 | Gong | H04L 12/12 |
| 11,336,489 B1* | 5/2022 | Lue | H04L 25/03146 |
| 2010/0322125 A1* | 12/2010 | Lee | H04W 52/0219 370/311 |
| 2014/0307281 A1* | 10/2014 | Park | G06F 1/3209 358/1.13 |
| 2021/0055963 A1* | 2/2021 | An | H04L 12/10 |

* cited by examiner

SLEEP-MODE FOR ETHERNET CONTROLLER

CROSS-REFERENCE TO RELATED APPLICATIONS

This application claims the benefit of U.S. Provisional Patent Application Ser. No. 62/941,164, filed on Nov. 27, 2019, and titled "SLEEP-MODE FOR ETHERNET CONTROLLER," which is hereby incorporated herein by reference in its entirety.

SUMMARY

In an example, a configuration circuit includes a connector and a controller communicatively coupled to the connector via one or more signal lines. The configuration circuit further includes a microcontroller communicatively coupled to the controller via an interface. The configuration circuit further includes a connection detection circuit communicatively coupled to the microcontroller and the one or more signal lines. The connection detection circuit is configured to determine whether communication traffic between the connector and the controller on the one or more signal lines is detected, and output an interrupt signal to the microcontroller in response to detecting communication traffic between the connector and the controller on the one or more signal lines. The microcontroller is configured to instruct the controller to wake from a low-power sleep mode in response to receiving the interrupt signal from the connection detection circuit.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
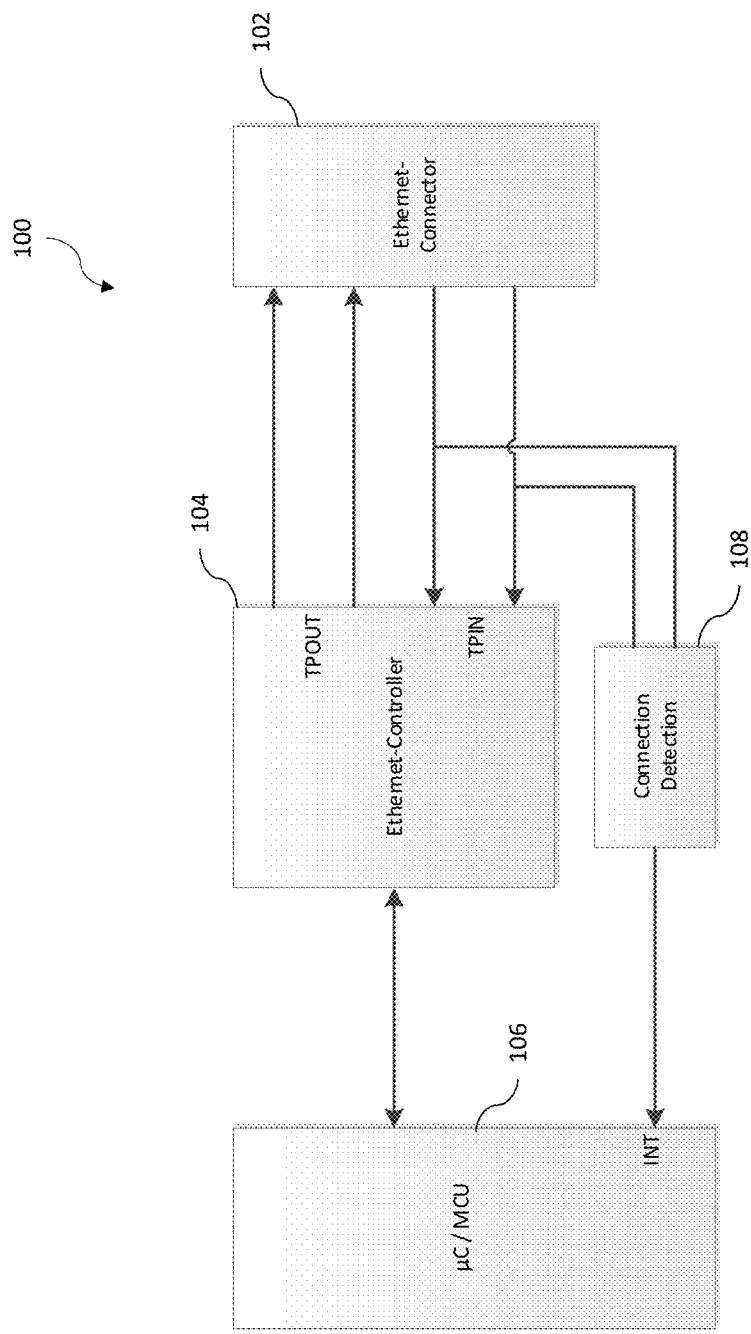
FIG. 1 is a block diagram of an example configuration circuit.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Devices included in radio frequency distribution systems, such as a repeater or units of a distributed antenna system, can be configured with an external device using a local area network (LAN) connection. The LAN connection is typically established using a non-service management port and an Ethernet controller, and the device can be configured via the LAN connection using a web browser, for example. Once the device is configured, the LAN connection is not needed until the device needs to be reconfigured. For radio frequency distribution systems, reconfiguration is infrequently performed, so the LAN connection may not be needed for one or more months.

In order to reduce power consumption, previous designs have placed a microcontroller that controls the Ethernet controller into sleep mode until the Ethernet controller detects communication. However, these previous designs are problematic in components of radio frequency distribution systems for multiple reasons. The LAN connection is not active most of the time and the Ethernet controller is not needed for other purposes. Further, the devices in radio frequency distribution systems often require a functioning processor during operation. If the microcontroller is placed in sleep mode as in previous designs, it cannot be used during operation. The previous designs either cannot place the microcontroller in sleep mode a majority of the time or a separate processor (for example, microcontroller) is required for operation, which both increase the power consumption of the device.

The example systems and methods described herein reduce power consumption for devices configurable via a LAN connection compared to previous techniques. The systems and methods use the microcontroller to instruct the Ethernet controller to operate in a low-power sleep mode and wake the Ethernet controller when communication traffic is detected. In some examples, the microcontroller is notified that communication traffic is detected by a connection detection circuit, which is communicatively coupled to one or more signal lines between the Ethernet connector or port and the Ethernet controller. The microcontroller instructs the Ethernet controller to wake from the low-power sleep mode in response to the notification from the connection detection circuit.

While the systems and methods described herein specifically refer to Ethernet components, it should be understood that the present application is not limited to Ethernet and other types of cabling and technologies used to establish a LAN connection (such as, for example, Token Ring, Fiber Distributed Data Interface, or the like) could also be used.

FIG. 1 is a block diagram of an example configuration circuit 100 that can be included in a device configurable via a LAN connection. In the example of FIG. 1, the configuration circuit 100 includes an Ethernet connector 102, an Ethernet controller 104, a microcontroller 106, and a connection detection circuit 108. While a single instance of each component is shown in FIG. 1, it should be understood that this is for ease of illustration and the device can include one or more of the components shown in FIG. 1.

In some examples, the Ethernet connector 102 is a management or non-service port (for example, RJ45 jack) of a device that includes the configuration circuit 100. The Ethernet connector 102 of the configuration circuit 100 is configured to couple to a connector of an Ethernet cable, which connects the configuration circuit to the external device (for example, computer) used to configure the device that includes the configuration circuit 100. For example, one connector of the Ethernet cable can be plugged into the Ethernet connector 102 of the configuration circuit 100 and the other connector of the Ethernet cable can be plugged in an Ethernet connector of the external device.

The Ethernet connector 102 is configured to transmit and receive traffic with the Ethernet controller 104, which is communicatively coupled to the Ethernet connector 102 via one or more signal lines. In the example shown in FIG. 1, the Ethernet controller 104 is communicatively coupled to the Ethernet connector 102 via two signal lines. Other amounts of signal lines could also be used. In the example shown in FIG. 1, the Ethernet controller 104 is configured to receive traffic from the Ethernet connector 102 via the differential signal inputs TPIN and to transmit traffic to the Ethernet connector 102 via the different signal outputs TPOUT.

The microcontroller 106 is communicatively coupled to the Ethernet controller 104 via an interface. In some examples, the interface is a Serial Peripheral Interface (SPI). Other interfaces between the microcontroller 106 and the Ethernet controller 104 could also be used. The microcontroller 106 is configured to control the Ethernet controller 104 by sending one or more commands to the Ethernet controller 104 via the interface.

Once the device including the configuration circuit 100 is configured by the external device, the Ethernet controller 104 is not needed until the device needs to be reconfigured. In order to reduce the power consumption of the device when the LAN connection is not needed, the configuration circuit 100 is configured to put the Ethernet controller 104 into a low-power sleep mode when it is not needed.

To facilitate the transition of the Ethernet controller 104 between the normal mode and low-power sleep mode, the configuration circuit 100 includes a connection detection circuit 108. In the example shown in FIG. 1, the connection detection circuit 108 is communicatively coupled to the signal lines between the Ethernet connector 102 and the Ethernet controller 104. In some examples, the connection detection circuit 108 is coupled to the signal lines using signal couplers that are communicatively coupled to respective inputs of the connection detection circuit 108. In some examples, the signal couplers are resistor dividers. Other types of signal couplers could also be used. The connection detection circuit 108 is also communicatively coupled to the microcontroller 106.

The connection detection circuit 108 is configured to detect when the LAN connection is active or inactive. When the LAN connection is inactive (for example, no communication traffic), this means that the Ethernet controller 104 can be placed into the low-power sleep mode. In some examples, the connection detection circuit 108 is a comparator that is configured to detect when differential signals are applied to the signal lines between the Ethernet connector 102 and the Ethernet controller 104. The comparator is configured to output a signal based on a comparison of the inputs from the respective signal lines.

When communication traffic is not detected between the connector 102 and the Ethernet controller 104, this indicates an inactive LAN connection. In some examples, the connection detection circuit 108 is configured to output a low signal to the microcontroller 106 when signals are not detected. In other examples, the connection detection circuit 108 can be configured to output a high signal when communication traffic is not detected. In some examples, the microcontroller 106 is configured to instruct the Ethernet controller 104 to operate in the low-power sleep mode when the connection detection circuit 108 outputs the signal level associated with no communication traffic being detected.

When communication traffic is detected between the connector 102 and the Ethernet controller 104, this indicates an active LAN connection. The connection detection circuit 108 is configured to transmit an interrupt signal to the microcontroller 106 when communication traffic is detected. In some examples, the interrupt signal output by the connection detection circuit 108 is a high signal to the microcontroller 106. In other examples, the interrupt signal output by the connection detection circuit 108 is a low signal to the microcontroller 106. In response to receiving the interrupt signal from the connection detection circuit 108, the microcontroller 106 is configured to instruct the Ethernet controller 104 to wake from the low-power sleep mode and operate in the normal mode.

Figure 2:
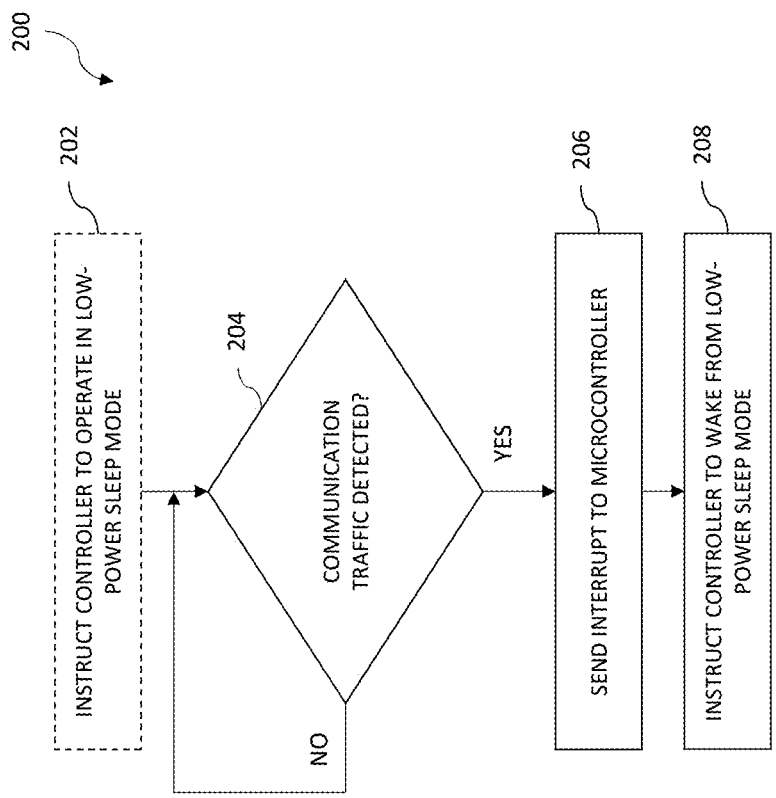
FIG. 2 is a flow diagram of an example method for conserving power for a configuration circuit.

FIG. 2 is a flow diagram of an example method 200 for reducing power consumption of a device. The common features discussed above with respect to configuration circuit 100 in FIG. 1 can include similar characteristics to those discussed with respect to method 200 and vice versa. In some examples, method 200 can be performed by components of a configuration circuit 100 located in a device.

Method 200 optionally begins with instructing the Ethernet controller of a configuration circuit to operate in a low-power sleep mode (block 202). In some examples, the low-power sleep mode is a reduced power mode where one or more components of the Ethernet controller are powered down. In some examples, the entire Ethernet controller is powered down during the low-power sleep mode. In some examples, the Ethernet controller is instructed to operate in the low-power sleep mode by a microcontroller of the configuration circuit in order to reduce power consumption when a LAN connection is not needed. In some examples, the Ethernet controller transitions to the low-power sleep mode in a different way.

Method 200 further includes determining whether communication traffic is detected between an Ethernet connector and the Ethernet controller of the configuration circuit (block 204). In some examples, the determination is performed using a connection detection circuit (such as, for example, connection detection circuit 108 discussed above with respect to FIG. 1) that is communicatively coupled to one or more signal lines between an Ethernet connector and the Ethernet controller of the configuration circuit.

In some examples, there are two differential signal lines between the Ethernet connector and the Ethernet controller. In such examples, the connection detection circuit can include a comparator that has two inputs coupled to each respective differential signal line using a signal coupler (for example, a resistor divider). The comparator receives any communication traffic coupled from the differential signal lines and outputs a signal depending on whether communication traffic is actually received from the signal couplers. When the LAN connection is needed, a negotiation is started between the external device connecting to the Ethernet connector and the device that includes the configuration circuit in order to establish a connection using the Ethernet connector and the Ethernet controller. The negotiation starts with sending one or more link pulses over the differential signal lines. In some examples, the connection detection circuit is configured to detect the link pulses for establishing an Ethernet connection. In other examples, other communication traffic signals can also be used for detection.

When communication traffic is not detected, the method 200 repeats the determination of block 204. When communication traffic is detected, the method 200 proceeds with sending an interrupt signal to a microcontroller of the configuration circuit (block 206). In some examples, the interrupt signal includes a high signal output from the connection detection circuit (for example, a comparator), which indicates to the microcontroller that a LAN connection is needed.

Method 200 includes instructing the Ethernet controller of the configuration circuit to wake from the low-power sleep mode in response to receiving the interrupt signal (block 208). In some examples, the microcontroller provides one or more commands to the Ethernet controller to activate the components of the Ethernet controller that were deactivated in the low-power sleep mode such that the Ethernet controller then operates in its normal mode. In some examples, the normal mode is a full-power mode where the Ethernet controller is configured to operate at full functionality.

Figure 3:
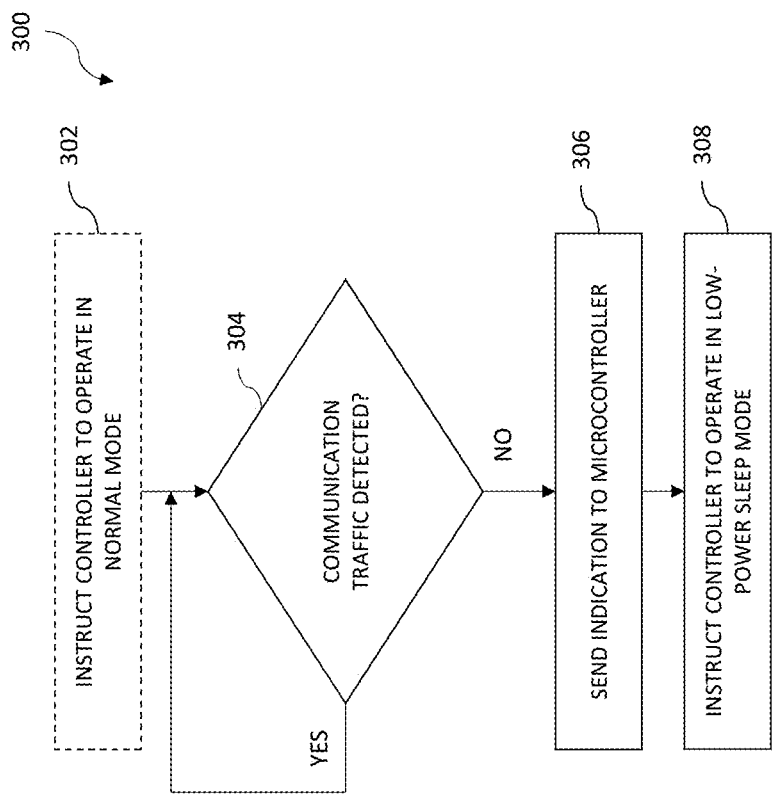
FIG. 3 is a flow diagram of an example method for conserving power for a configuration circuit.

In some examples, the connection detection circuit and microcontroller are also configured to determine when the Ethernet controller of the configuration circuit should be put into the low-power sleep mode (for example, when the LAN connection is not needed). FIG. 3 is a flow diagram of an example method 300 for reducing power consumption of a configuration circuit. The common features discussed above with respect to configuration circuit 100 in FIG. 1 and method 200 in FIG. 2 can include similar characteristics to those discussed with respect to method 300 and vice versa. In some examples, method 300 can be performed by components of configuration circuits 100 located in one or more devices in a system.

Method 300 optionally includes instructing the Ethernet controller of a configuration circuit to operate in a normal mode (block 302). In some examples, the microcontroller provides one or more commands to the Ethernet controller to activate the components of the Ethernet controller that are inactive as a result of operating in a low-power sleep mode. In some examples, the normal mode is a full-power mode where the Ethernet controller is configured to operate at full functionality.

Method 300 further includes determining whether communication traffic is detected between the Ethernet connector and the Ethernet controller (block 304). In some examples, the determination is performed using a connection detection circuit (such as, for example, connection detection circuit 108 discussed above with respect to FIG. 1) that is communicatively coupled to the one or more signal lines between an Ethernet connector and the Ethernet controller of the configuration circuit.

In some examples, there are two differential signal lines between the Ethernet connector and the Ethernet controller. In such examples, the connection detection circuit can include a comparator that is coupled to each of the differential signal lines using a signal coupler (for example, a resistor divider). The comparator receives any traffic coupled from the differential signal lines and outputs a signal depending on whether communication traffic is actually received from the signal couplers. When the Ethernet controller is operating in normal mode and the device including the configuration circuit is being configured, there will likely be relatively consistent communication traffic between the Ethernet connector and the Ethernet controller. Therefore, general communication traffic can be utilized while the Ethernet controller is operating in normal mode.

When communication traffic is detected, the method 300 repeats the determination in block 304 so normal mode is maintained. When communication traffic is not detected, the method 300 proceeds with sending an indication to a microcontroller that communication traffic is not detected (block 306). In some examples, the indication includes a low signal output from the connection detection circuit (for example, a comparator), which indicates to the microcontroller that a LAN connection is not needed.

Method 300 further includes instructing the Ethernet controller of the configuration circuit to operate in a low-power sleep mode in response to receiving the indication (block 308). In some examples, the low-power sleep mode is a reduced power mode where one or more components of the Ethernet controller are powered down. In some examples, the entire Ethernet controller is powered down during the low-power sleep mode. In some examples, the Ethernet controller is instructed to operate in the low-power sleep mode by a microcontroller of the configuration circuit in order to reduce power consumption when a LAN connection is not needed.

The example circuit and methods described above with respect to FIGS. 1-3 can reduce power consumption of the Ethernet controller by about 0.5 W when it operates in the low-power sleep mode. The microcontroller can also be used for other functionality in the device since the microcontroller does not operate in the low-power sleep mode. The example circuit and methods described above are most effective for devices that are configured via a LAN connection once a month or even less frequently. Devices of a radio frequency distribution system can particularly benefit from the configuration circuit and methods described above since the microcontroller can be utilized for radio frequency distribution in addition to controlling the Ethernet controller.

Figure 4:
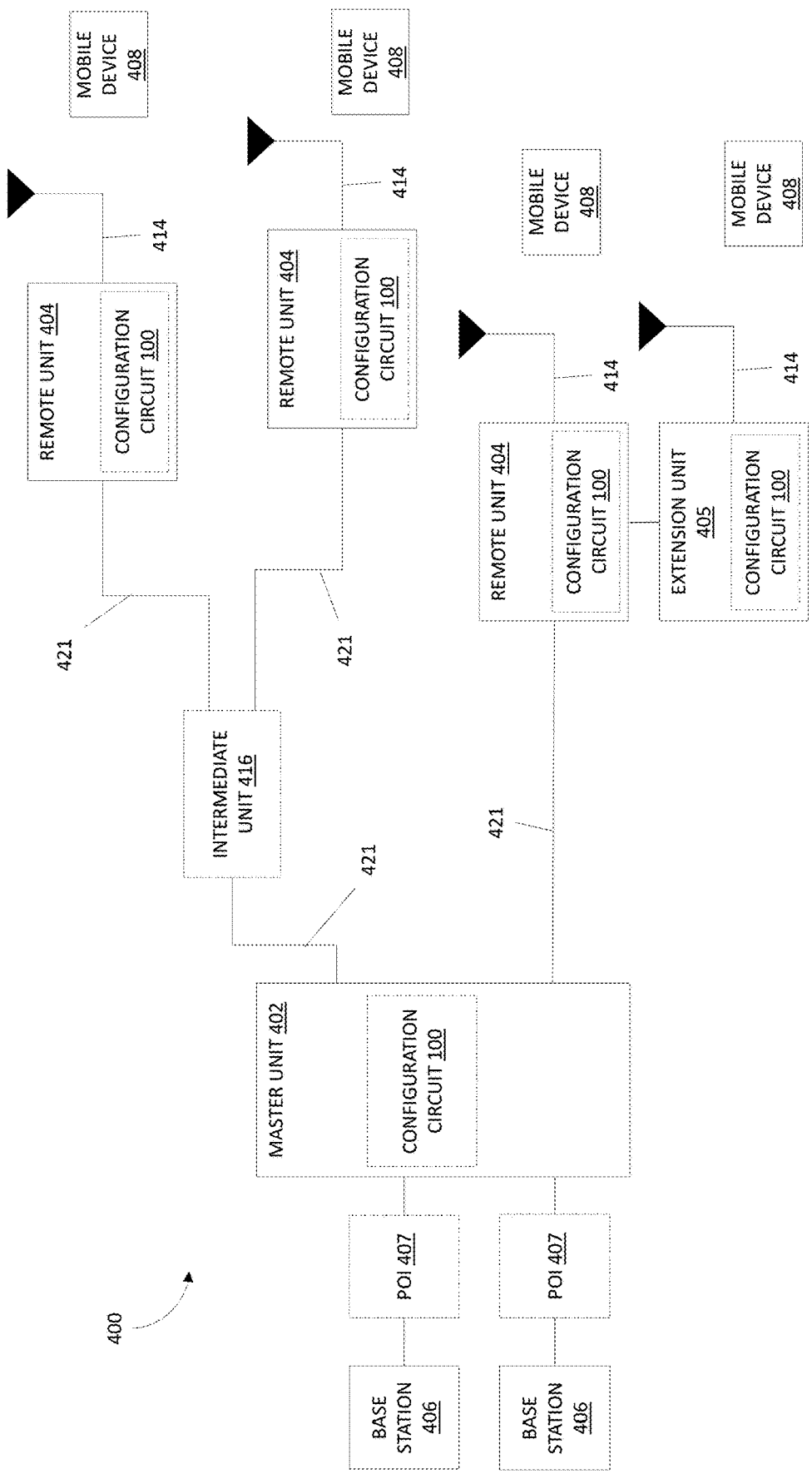
FIG. 4 is a block diagram of an example distributed antenna system including a configuration circuit.

FIG. 4 is a block diagram of an example distributed antenna system (DAS) 400 that includes the configuration circuit 100 in one or more components. In the example of FIG. 4, the distributed antenna system 400 includes a master unit 402 communicatively coupled to one or more remote antenna units 404.

In the example of FIG. 4, the DAS 400 includes one or more master units 402 (also referred to as "host units" or "central area nodes" or "central units") and one or more remote antenna units 404 (also referred to as "remote units" or "radiating points") that are communicatively coupled to the one or more master units 402. In this example, the DAS 400 comprises a digital DAS, in which DAS traffic is distributed between the master units 402 and the remote antenna units 404 in digital form. The DAS 400 can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The master unit 402 is communicatively coupled to the plurality of base stations 406. One or more of the base stations 406 can be co-located with the respective master unit 402 to which it is coupled (for example, where the base station 406 is dedicated to providing base station capacity to the DAS 400). Also, one or more of the base stations 406 can be located remotely from the respective master unit 402 to which it is coupled (for example, where the base station 406 is a macro base station providing base station capacity to a macro cell in addition to providing capacity to the DAS 400). In this latter case, a master unit 402 can be coupled to a donor antenna using an over-the-air repeater in order to wirelessly communicate with the remotely located base station.

The base stations 406 can be implemented in a traditional manner in which a base band unit (BBU) is deployed at the same location with a radio head (RRH) to which it is coupled, where the BBU and RRH are coupled to each other using optical fibers over which front haul data is communicated as streams of digital IQ samples (for example, in a format that complies with one of the Common Public Radio Interface (CPRI), Open Base Station Architecture Initiative (OBSAI), and Open RAN (ORAN) families of specifications). Also, the base stations 406 can be implemented in other ways (for example, using a centralized radio access network (C-RAN) topology where multiple BBUs are deployed together in a central location, where each of BBU is coupled to one or more RRHs that are deployed in the area in which wireless service is to be provided. Also, the base station 406 can be implemented as a small cell base station in which the BBU and RRH functions are deployed together in a single package.

The master unit 402 can be configured to use wideband interfaces or narrowband interfaces to the base stations 406. Also, the master unit 402 can be configured to interface with the base stations 406 using analog radio frequency (RF) interfaces or digital interfaces (for example, using a CPRI, OBSAI, or ORAN digital IQ interface). In some examples, the master unit 402 interfaces with the base stations 406 via one or more wireless interface nodes (not shown). A wireless interface node can be located, for example, at a base station hotel, and group a particular part of a RF installation to transfer to the master unit 402.

Traditionally, a master unit 402 interfaces with one or more base stations 406 using the analog radio frequency signals that each base station 406 communicates to and from a mobile device 408 (also referred to as "mobile units" or "user equipment") of a user using a suitable air interface standard. Although the devices 408 are referred to here as "mobile" devices 408, it is to be understood that the devices 408 need not be mobile in ordinary use (for example, where the device 408 is integrated into, or is coupled to, a sensor unit that is deployed in a fixed location and that periodically wirelessly communicates with a gateway or other device). The DAS 400 operates as a distributed repeater for such radio frequency signals. RF signals transmitted from each base station 406 (also referred to herein as "downlink RF signals") are received at the master unit. In such examples, the master unit 402 uses the downlink RF signals to generate a downlink transport signal that is distributed to one or more of the remote antenna units 404. Each such remote antenna unit 404 receives the downlink transport signal and reconstructs a version of the downlink RF signals based on the downlink transport signal and causes the reconstructed downlink RF signals to be radiated from an antenna 414 coupled to or included in that remote antenna unit 404.

In some aspects, the master unit 402 is directly coupled to the remote antenna units 404. In such aspects, the master unit 402 is coupled to the remote antenna units 404 using cables 421. For example, the cables 421 can include optical fiber or Ethernet cable complying with the Category 5, Category 5e, Category 6, Category 6A, or Category 7 specifications. Future communication medium specifications used for Ethernet signals are also within the scope of the present disclosure.

A similar process can be performed in the uplink direction. RF signals transmitted from mobile devices 408 (also referred to herein as "uplink RF signals") are received at one or more remote antenna units 404 via an antenna 414. Each remote antenna unit 404 uses the uplink RF signals to generate an uplink transport signal that is transmitted from the remote antenna unit 404 to a master unit 402. The master unit 402 receives uplink transport signals transmitted from one or more remote antenna units 404 coupled to it. The master unit 402 can combine data or signals communicated via the uplink transport signals from multiple remote antenna units 404 (for example, where the DAS 400 is implemented as a digital DAS 400, by digitally summing corresponding digital samples received from the various remote antenna units 404) and generates uplink RF signals from the combined data or signals. In such examples, the master unit 402 communicates the generated uplink RF signals to one or more base stations 406. In this way, the coverage of the base stations 406 can be expanded using the DAS 400.

As noted above, in the example shown in FIG. 4, the DAS 400 is implemented as a digital DAS. In a "digital" DAS, signals received from and provided to the base stations 406 and mobile devices 408 are used to produce digital in-phase (I) and quadrature (Q) samples, which are communicated between the master unit 402 and remote antenna units 404. It is important to note that this digital IQ representation of the original signals received from the base stations 406 and from the mobile units still maintains the original modulation (that is, the change in the amplitude, phase, or frequency of a carrier) used to convey telephony or data information pursuant to the cellular air interface protocol used for wirelessly communicating between the base stations 406 and the mobile units. Examples of such cellular air interface protocols include, for example, the Global System for Mobile Communication (GSM), Universal Mobile Telecommunications System (UMTS), High-Speed Downlink Packet Access (HSDPA), Long-Term Evolution (LTE), Citizens Broadband Radio Service (CBRS), and fifth generation New Radio (5G NR) air interface protocols. Also, each stream of digital IQ samples represents or includes a portion of wireless spectrum. For example, the digital IQ samples can represent a single radio access network carrier (for example, a 5G NR carrier of 40 MHz or 400 MHz) onto which voice or data information has been modulated using a 5G NR air interface. However, it is to be understood that each such stream can also represent multiple carriers (for example, in a band of frequency spectrum or a sub-band of a given band of frequency spectrum).

In the example shown in FIG. 4, the master unit 402 can be configured to interface with one or more base stations 406 using an analog RF interface (for example, via the analog RF interface of an RRH or a small cell base station). In some examples, the base stations 406 can be coupled to the master unit 402 using a network of attenuators, combiners, splitters, amplifiers, filters, cross-connects, etc., which is referred to collectively as a point-of-interface (POI) 407. This is done so that, in the downlink, the desired set of RF carriers output by the base stations 406 can be extracted, combined, and routed to the appropriate master unit 402, and so that, in the uplink, the desired set of carriers output by the master unit 402 can be extracted, combined, and routed to the appropriate interface of each base station 406. In other examples, the POI 407 can be part of the master unit 402.

In the example shown in FIG. 4, in the downlink, the master unit 402 can produce digital IQ samples from an analog signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of radio frequency spectrum output by one or more base stations 406. Each portion of radio frequency spectrum can include, for example, a band of wireless spectrum, a sub-band of a given band of wireless spectrum, or an individual wireless carrier.

Likewise, in the uplink, the master unit 402 can produce an uplink analog signal from one or more streams of digital IQ samples received from one or more remote antenna units 404 by digitally combining streams of digital IQ samples that represent the same carriers or frequency bands or sub-bands received from multiple remote antenna units 404 (for example, by digitally summing corresponding digital IQ samples from the various remote antenna units 404), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

In the example shown in FIG. 4, the master unit 402 can be configured to interface with one or more base stations 406 using a digital interface (in addition to, or instead of) interfacing with one or more base stations 406 via an analog RF interface. For example, the master unit 402 can be configured to interact directly with one or more BBUs using the digital IQ interface that is used for communicating between the BBUs and an RRHs (for example, using the CPRI serial digital IQ interface).

In the downlink, the master unit 402 terminates one or more downlink streams of digital IQ samples provided to it from one or more BBUs and, if necessary, converts (by re-sampling, synchronizing, combining, separating, gain adjusting, etc.) them into downlink streams of digital IQ samples compatible with the remote antenna units 404 used in the DAS 400. In the uplink, the master unit 402 receives uplink streams of digital IQ samples from one or more remote antenna units 404, digitally combining streams of digital IQ samples that represent the same carriers or frequency bands or sub-bands received from multiple remote antenna units 404 (for example, by digitally summing corresponding digital IQ samples received from the various remote antenna units 404), and, if necessary, converts (by re-sampling, synchronizing, combining, separating, gain adjusting, etc.) them into uplink streams of digital IQ samples compatible with the one or more BBUs that are coupled to that master unit 402.

In the downlink, each remote antenna unit 404 receives streams of digital IQ samples from the master unit 402, where each stream of digital IQ samples represents a portion of wireless radio frequency spectrum output by one or more base stations 406. Each remote antenna unit 404 generates, from the downlink digital IQ samples, one or more downlink RF signals for radiation from the one or more antennas coupled to that remote antenna unit 404 for reception by any mobile devices 408 in the associated coverage area. In the uplink, each remote antenna unit 404 receives one or more uplink radio frequency signals transmitted from any mobile devices 408 in the associated coverage area, generates one or more uplink streams of digital IQ samples derived from the received one or more uplink radio frequency signals, and transmits them to the master unit 402.

Each remote antenna unit 404 can be communicatively coupled directly to one or more master units 402 or indirectly via one or more other remote antenna units 404 and/or via one or more intermediate units 416 (also referred to as "expansion units" or "transport expansion nodes"). The latter approach can be done, for example, in order to increase the number of remote antenna units 404 that a single master unit 402 can feed, to increase the master-unit-to-remote-antenna-unit distance, and/or to reduce the amount of cabling needed to couple a master unit 402 to its associated remote antenna units 404. The expansion units are coupled to the master unit 402 via one or more cables 421.

In the example DAS 400 shown in FIG. 4, a remote antenna unit 404 is shown having another co-located remote antenna unit 405 (also referred to herein as an "extension unit") communicatively coupled to it. Subtending a co-located extension remote antenna unit 405 from another remote antenna unit 404 can be done in order to expand the number of frequency bands that are radiated from that same location and/or to support MIMO service (for example, where different co-located remote antenna units radiate and receive different MIMO streams for a single MIMO frequency band). The remote antenna unit 404 is communicatively coupled to the "extension" remote antenna units 405 using a fiber optic cable, a multi-conductor cable, coaxial cable, or the like. In such an implementation, the remote antenna units 405 are coupled to the master unit 402 of the DAS 400 via the remote antenna unit 404.

In some examples, one or more components of the DAS 400 include the configuration circuit 100 as described above with respect to FIGS. 1-3. For example, the master unit 402 and/or remote antenna units 404, 405 can be configured using a management port that is not used for providing service to the one or more coverage areas of the DAS 400. The microcontroller 106 of the respective configuration circuits 100 can be utilized for other functionality in the respective device. In some examples, the microcontroller 106 is used to control the uplink and downlink operation of the respective master unit 402 or respective remote antenna unit 404, 405 in addition to providing commands to the respective Ethernet controllers 104 coupled to the respective management ports 102.

Figure 5:
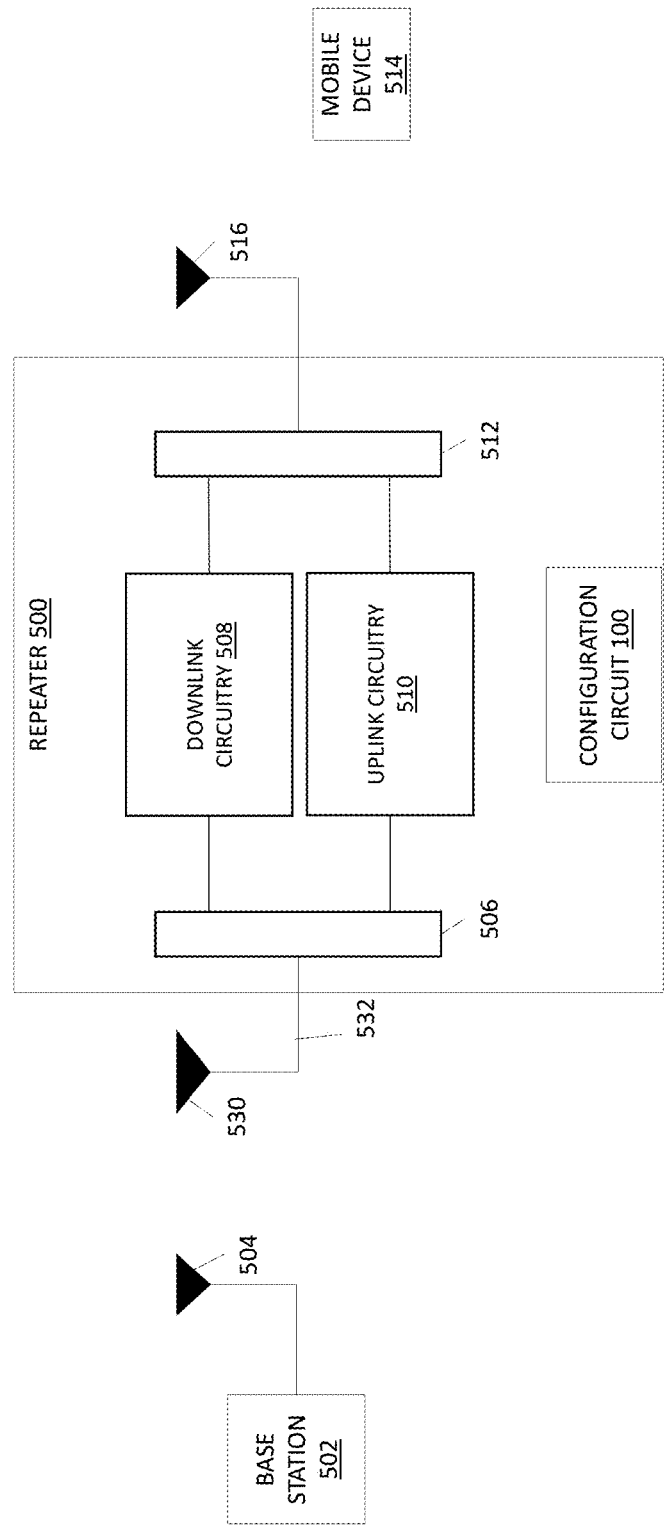
FIG. 5 is a block diagram of an example single-node repeater including a configuration circuit.

Other types of radio frequency distribution systems can also benefit from the configuration circuit and methods described above. FIG. 5 illustrates an example of a single-node repeater 500 that includes the configuration circuit as discussed above with respect to FIGS. 1-3.

In the exemplary embodiment shown in FIG. 5, the single-node repeater 500 is coupled to one or more base stations 502 using a donor antenna 530.

The single-node repeater 500 comprises a first duplexer 506 having a common port that is coupled to the donor antenna 530 via a cable 532, a downlink port that is coupled to downlink circuitry 508, and an uplink port that is coupled to uplink circuitry 510. The single-node repeater 500 comprises a second duplexer 512 having a common port that is coupled to the coverage antenna 516, a downlink port that is coupled to the downlink circuitry 508, and an uplink port that is coupled to the uplink circuitry 510.

In general, the single-node repeater 500 is configured to receive one or more downlink signals from one or more base stations 502. Each base station downlink signal includes one or more radio frequency channels used for communicating in the downlink direction with the mobile device 514 over the relevant one or more wireless air interfaces. The downlink circuitry 508 is configured to amplify the downlink signals received at the repeater 500 and re-radiate the amplified downlink signals via the coverage antenna 516. As a part of doing this, the downlink circuitry 508 can be configured to filter the downlink signals to separate out the individual channels, individually amplify each filtered downlink channel signal, combine the individually amplified downlink channel signals, and re-radiate the resulting combined signal.

Similar processing is performed in the uplink. The single-node repeater 500 is configured to receive one or more uplink signals from mobile device 514. Each mobile device uplink signal includes one or more radio frequency channels used for communicating in the uplink direction with one or more base stations 502 over the relevant one or more wireless air interfaces. The uplink circuitry 510 is configured to amplify the uplink signals received at the repeater 500 and re-radiate the amplified uplink signals via the donor antenna 504. As a part of doing this, the uplink circuitry 510 can be configured to filter the uplink signals to separate out the individual channels, individually amplify each filtered uplink channel signal, combine the individually amplified uplink channel signals, and re-radiate the resulting combined signal.

The single-node repeater 500 can be configured to implement one or more features to provide sufficient isolation between the donor antenna 504 and the coverage antenna 516. These features can include gain control circuitry and adaptive cancellation circuitry. Other features can be implemented. These features can be implemented in one or more of the downlink circuitry 508 and/or the uplink circuitry 510. These features can also be implemented in separate circuitry.

The single-node repeater 500 also includes the configuration circuit 100 as described above with respect to FIGS. 1-3. The single-node repeater 500 can be configured using a management port that is not used for providing service to the coverage areas of the single-node repeater 500. The microcontroller 106 of the configuration circuit 100 can be utilized for other functionality in the single-node repeater 500 when it is not needed for providing commands to the Ethernet controller 104. In some examples, the microcontroller 106 is used to operate the uplink circuitry 510 and/or downlink circuitry 508 of the single-node repeater 500 in addition to providing commands to the respective Ethernet controllers 104 coupled to the respective management ports 102.

The various circuitry and features of the single-node repeater 500 can be implemented in analog circuitry, digital circuitry, or combinations of analog circuitry and digital circuitry. The downlink circuitry 508 and uplink circuitry 510 can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink circuitry 508 and uplink circuitry 510 may share common circuitry and/or components.

In various aspects, system elements, method steps, or examples described throughout this disclosure (such as the configuration circuit, distributed antenna system, repeater, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAIVIBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a configuration circuit, comprising: a connector; a controller communicatively coupled to the connector via one or more signal lines; a microcontroller communicatively coupled to the controller via an interface; and a connection detection circuit communicatively coupled to the microcontroller and the one or more signal lines, wherein the connection detection circuit is configured to: determine whether communication traffic between the connector and the controller on the one or more signal lines is detected; and output an interrupt signal to the microcontroller in response to detecting communication traffic between the connector and the controller on the one or more signal lines; wherein the microcontroller is configured to instruct the controller to wake from a low-power sleep mode in response to receiving the interrupt signal from the connection detection circuit.

Example 2 includes the configuration circuit of Example 1, wherein the connector is an Ethernet connector, wherein the controller is an Ethernet controller.

Example 3 includes the configuration circuit of Example 2, wherein the connection detection circuit is configured to monitor the one or more signal lines for a link pulse transmitted over the one or more signal lines.

Example 4 includes the configuration circuit of any of Examples 1-3, wherein the one or more signal lines include a first signal line and a second signal line, wherein the controller is configured to receive a first differential signal from the connector via the first signal line and to receive a second differential signal from the connector via the second signal line.

Example 5 includes the configuration circuit of Example 4, wherein the connection detection circuit is a comparator communicatively coupled to both the first signal line and the second signal line.

Example 6 includes the configuration circuit of any of Examples 1-5, wherein the connection detection circuit is further configured to output an indication to the microcontroller in response to detecting a break in communication traffic between the connector and the controller on the one or more signal lines; wherein the microcontroller is further configured to instruct the controller to operate in the low-power sleep mode in response to receiving the indication from the connection detection circuit.

Example 7 includes a unit of a repeater system, comprising: downlink circuitry configured to receive downlink signals sourced from a base station and to output a gain-adjusted downlink signal to one or more user equipment in a coverage area of the repeater system; uplink circuitry configured to receive uplink signals from one or more user equipment in the coverage area of the repeater system and to output a gain-adjusted uplink signal to the base station; a non-service management port; a controller communicatively coupled to the non-service management port via one or more signal lines; a microcontroller communicatively coupled to the controller via an interface; and a connection detection circuit communicatively coupled to the microcontroller and the one or more signal lines, wherein the connection detection circuit is configured to: determine whether communication traffic between the non-service management port and the controller on the one or more signal lines is detected; and output an interrupt signal to the microcontroller in response to detecting communication traffic between the non-service management port and the controller on the one or more signal lines; wherein the microcontroller is configured to instruct the controller to wake from a low-power sleep mode in response to receiving the interrupt signal from the connection detection circuit.

Example 8 includes the unit of Example 7, wherein the unit is a single-node repeater.

Example 9 includes the unit of any of Examples 7-8, wherein the unit is a master unit of a distributed antenna system, wherein the master unit is communicatively coupled to one or more remote antenna units that are located remotely from the master unit.

Example 10 includes the unit of any of Examples 7-9, wherein the unit is a remote antenna unit of a distributed antenna system, wherein the distributed antenna system comprises a master unit communicatively coupled to the remote antenna unit, wherein the remote antenna unit is located remotely from the master unit.

Example 11 includes the unit of any of Examples 7-10, wherein the non-service management port is an Ethernet connector, wherein the controller is an Ethernet controller.

Example 12 includes the unit of Example 11, wherein the connection detection circuit is configured to monitor the one or more signal lines for a link pulse.

Example 13 includes the unit of any of Examples 7-12, wherein the one or more signal lines include a first signal line and a second signal line, wherein the controller is configured to receive a first differential signal from the non-service management port via the first signal line and to receive a second differential signal from the non-service management port via the second signal line.

Example 14 includes the unit of Example 13, wherein the connection detection circuit is a comparator communicatively coupled to both the first signal line and the second signal line.

Example 15 includes the unit of any of Examples 7-14, wherein the microcontroller is further configured to control operation of the downlink circuitry and/or the uplink circuitry.

Example 16 includes a method for reducing power consumption of a device configurable via a local area network connection, the method comprising: instructing a controller of a configuration circuit to operate in a low-power sleep mode, wherein the controller is communicatively coupled to a connector via one or more signal lines; determining whether communication traffic is detected between the connector and the controller; when communication traffic is not detected between the connector and the controller, repeating the determination of whether communication traffic is detected between a connector and the controller; when communication traffic is detected between the connector and the controller, sending an interrupt signal to a microcontroller; and in response to the interrupt signal, instructing the controller to wake from the low-power sleep mode.

Example 17 includes the method of Example 16, wherein the connector is an Ethernet connector, wherein the controller is an Ethernet controller.

Example 18 includes the method of Example 17, wherein determining whether communication traffic is detected between a connector and a controller of a configuration circuit of the device includes monitoring the one or more signal lines between the Ethernet connector and the Ethernet controller for a link pulse.

Example 19 includes the method of any of Examples 16-18, wherein the one or more signal lines include a first signal line and a second signal line, wherein determining whether communication traffic is detected between the connector and the controller includes receiving a first differential signal from the connector via the first signal line and receiving a second differential signal from the connector via the second signal line.

Example 20 includes the method of any of Examples 16-19, further comprising: when communication traffic is not detected between the connector and the controller, sending an indication to the microcontroller that there is a break in communication traffic between the connector and the controller on the one or more signal lines; and instructing the controller to operate in the low-power sleep mode in response to the indication.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A configuration circuit, comprising:
   a connector;
   a controller communicatively coupled to the connector via one or more signal lines;
   a microcontroller communicatively coupled to the controller via an interface; and
   a connection detection circuit communicatively coupled to the microcontroller and the one or more signal lines, wherein the connection detection circuit is separate from the controller, wherein the connection detection circuit is configured to:
      detect communication traffic between the connector and the controller on the one or more signal lines; and
      output an interrupt signal to the microcontroller in response to detecting communication traffic between the connector and the controller on the one or more signal lines;
   wherein, in response to receiving the interrupt signal from the connection detection circuit, the microcontroller is configured to instruct the controller to wake from a low-power sleep mode;
   wherein, in response to receiving instructions from the microcontroller to wake from the low-power sleep mode, the controller is configured to transition from the low-power sleep mode to a normal mode;
   wherein the connection detection circuit is further configured to output an indication to the microcontroller in response to detecting a break in communication traffic between the connector and the controller on the one or more signal lines;
   wherein, in response to receiving the indication from the connection detection circuit, the microcontroller is further configured to instruct the controller to operate in the low-power sleep mode.

2. The configuration circuit of claim 1, wherein the connector is an Ethernet connector, wherein the controller is an Ethernet controller.

3. The configuration circuit of claim 2, wherein the connection detection circuit is configured to monitor the one or more signal lines for a link pulse transmitted over the one or more signal lines.

4. The configuration circuit of claim 1, wherein the one or more signal lines include a first signal line and a second signal line, wherein the controller is configured to receive a first differential signal from the connector via the first signal line and to receive a second differential signal from the connector via the second signal line.

5. The configuration circuit of claim 4, wherein the connection detection circuit is a comparator communicatively coupled to both the first signal line and the second signal line.

6. A unit of a repeater system, comprising:
   downlink circuitry configured to receive downlink signals sourced from a base station and to output a gain-adjusted downlink signal to one or more user equipment in a coverage area of the repeater system;
   uplink circuitry configured to receive uplink signals from one or more user equipment in the coverage area of the repeater system and to output a gain-adjusted uplink signal to the base station;
   a non-service management port;
   a controller communicatively coupled to the non-service management port via one or more signal lines;
   a microcontroller communicatively coupled to the controller via an interface; and
   a connection detection circuit communicatively coupled to the microcontroller and the one or more signal lines, wherein the connection detection circuit is separate from the controller, wherein the connection detection circuit is configured to:
      detect communication traffic between the non-service management port and the controller on the one or more signal lines; and
      output an interrupt signal to the microcontroller in response to detecting communication traffic between the non-service management port and the controller on the one or more signal lines;
   wherein, in response to receiving the interrupt signal from the connection detection circuit, the microcontroller is configured to instruct the controller to wake from a low-power sleep mode;
   wherein, in response to receiving instructions from the microcontroller to wake from the low-power sleep mode, the controller is configured to transition from the low-power sleep mode to a normal mode;
   wherein the connection detection circuit is further configured to output an indication to the microcontroller in response to detecting a break in communication traffic between the non-service management port and the controller on the one or more signal lines;
   wherein, in response to receiving the indication from the connection detection circuit, the microcontroller is further configured to instruct the controller to operate in the low-power sleep mode.

7. The unit of claim 6, wherein the unit is a single-node repeater.

8. The unit of claim 6, wherein the unit is a master unit of a distributed antenna system, wherein the master unit is communicatively coupled to one or more remote antenna units that are located remotely from the master unit.

9. The unit of claim 6, wherein the unit is a remote antenna unit of a distributed antenna system, wherein the distributed antenna system comprises a master unit communicatively coupled to the remote antenna unit, wherein the remote antenna unit is located remotely from the master unit.

10. The unit of claim 6, wherein the non-service management port is an Ethernet connector, wherein the controller is an Ethernet controller.

11. The unit of claim 10, wherein the connection detection circuit is configured to monitor the one or more signal lines for a link pulse.

12. The unit of claim 6, wherein the one or more signal lines include a first signal line and a second signal line, wherein the controller is configured to receive a first differential signal from the non-service management port via the first signal line and to receive a second differential signal from the non-service management port via the second signal line.

13. The unit of claim 12, wherein the connection detection circuit is a comparator communicatively coupled to both the first signal line and the second signal line.

14. The unit of claim 6, wherein the microcontroller is further configured to control operation of the downlink circuitry and/or the uplink circuitry.

15. A method for reducing power consumption of a device configurable via a local area network connection, the method comprising:

instructing a controller of a configuration circuit to operate in a low-power sleep mode, wherein the controller is communicatively coupled to a connector via one or more signal lines;
determining whether communication traffic is detected between the connector and the controller;
when communication traffic is not detected between the connector and the controller, repeating the determination of whether communication traffic is detected between a connector and the controller;
when communication traffic is detected between the connector and the controller, sending an interrupt signal to a microcontroller;
in response to the interrupt signal, instructing the controller to wake from the low-power sleep mode with the microcontroller;
in response to instructions from the microcontroller to wake from the low-power sleep mode, transitioning the controller from the low-power sleep mode to a normal mode;
when communication traffic is not detected between the connector and the controller, sending an indication to the microcontroller that there is a break in communication traffic between the connector and the controller on the one or more signal lines; and
instructing the controller to operate in the low-power sleep mode in response to the indication.

16. The method of claim 15, wherein the connector is an Ethernet connector, wherein the controller is an Ethernet controller.

17. The method of claim 16, wherein determining whether communication traffic is detected between a connector and a controller of a configuration circuit of the device includes monitoring the one or more signal lines between the Ethernet connector and the Ethernet controller for a link pulse.

18. The method of claim 15, wherein the one or more signal lines include a first signal line and a second signal line, wherein determining whether communication traffic is detected between the connector and the controller includes receiving a first differential signal from the connector via the first signal line and receiving a second differential signal from the connector via the second signal line.

* * * * *